Oct. 3, 1933.  R. H. ROSENBERG  1,928,763
GEAR
Filed Feb. 12, 1931
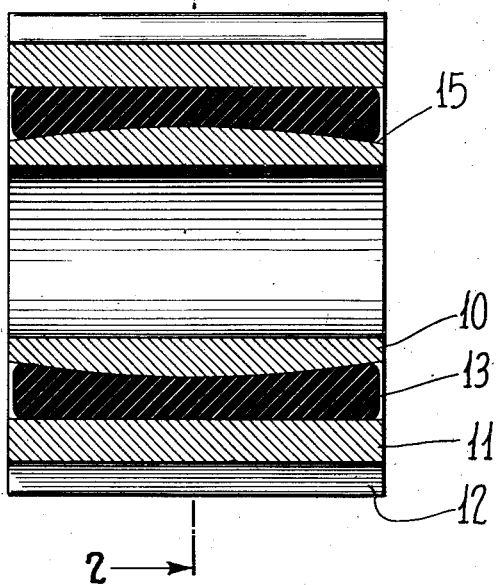
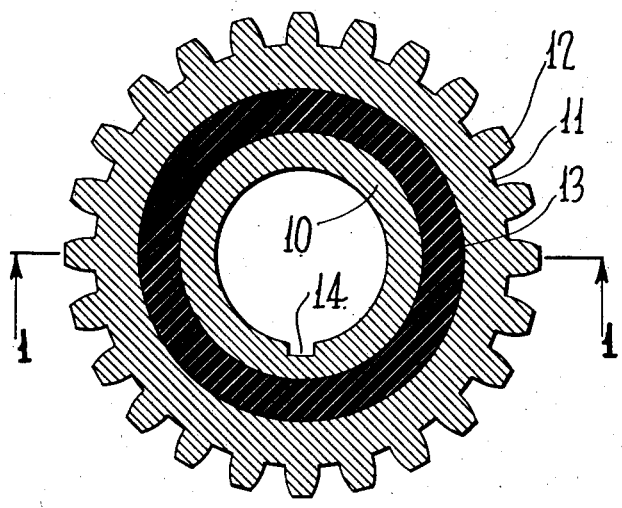
INVENTOR.
RALPH H. ROSENBERG.
BY
John P. Farbox
ATTORNEY.

Patented Oct. 3, 1933

1,928,763

UNITED STATES PATENT OFFICE 1,928,763

GEAR

Ralph H. Rosenberg, Detroit, Mich., assignor to Budd Wheel Company, Philadelphia, Pa., a corporation of Pennsylvania Application February 12, 1931. Serial No. 515,197

4 Claims. (Cl. 74—29)

My invention relates to the art of gears and has among its objects the provision of a cushioned drive between gears. Other objects pertain to means for attaining a certain universal movement of a gear with respect to its shaft whereby axially disaligned shafts may be driven by spur gears, and other types of gears which would otherwise fail to properly mesh due to deficient alignment may be adequately driven. A further object of my invention has been to eliminate back-lash in connection with a drive through a train of gears.

The manner in which I have attained these and other objects of my invention will be obvious from a reading of the sub-joined specification in the light of the attached drawing in which, Fig. 1 is a central axial section through my improved gear, and Fig. 2 is a transverse section on the line 2—2 of Fig. 1.

Referring to the drawing by reference characters, my improved gear comprises separate hub and rim sections 10 and 11 interconnected by a yieldable sleeve 13 which is preferably formed of live rubber. The gear teeth 12 are formed upon the rim 11 of the gear. A key way 14 is formed upon the inner circumference of the hub 10 and the outer circumference of this hub is formed of curved convex longitudinal shape in cross section as illustrated at 15 in Fig. 1. The inner circumference of the rim member of the gear may be formed of straight cylindrical shape or of concave longitudinal cross section as circumstances may dictate.

The rubber sleeve 13 is distorted in insertion between the telescoping metal members 10 and 11, this sleeve being preferably elongated from 50% to 150% in insertion between these members. As a result of this elongation the rubber member naturally tends to attempt to resume its normal shape and this tendency effects a strong frictional bond between the inner and outer surfaces of the rubber sleeve and the outer and inner surfaces of the hub and rim members respectively.

The manner in which I have attained the objects of my invention will now be apparent. The frictional bond of the rubber sleeve to the hub and rim members effects a cushioned drive between these members which eliminates shocks and back-lash.

The presence of a yieldable member between these hub and rim members also allows a certain oscillatory movement of the rim with respect to the hub about axes transverse to the axis of the gear, allowing the gear teeth 12 to properly align themselves with intermeshing gear teeth on a second gear. This facility of alignment is further enhanced by the provision of a convex outer longitudinal surface upon the hub 15 of the gear. By reason of this convexity, the rubber sleeve 13 is held in a condition of substantially smaller mass-tension adjacent its extremities than in its central longitudinal region. The curvilinear shape of the outer surface of the hub member thus not only affords a greater universal movement, but also effects a distribution of the mass-tension of the rubber tending to prevent the imposition of an extremely high stress upon the longitudinal extremities of the rubber sleeve when the hub and rim members are axially disaligned. Improved distribution of mass-tension also tends to assist in retaining the rubber sleeve in central position with respect to the other parts of the gear.

Modifications will be obvious to those skilled in the art and I do not therefore wish to be limited except by the terms of my sub-joined claims as interpreted in the light of the generic spirit of my invention.

I claim:

1. A gear comprising, in combination, an annular hub member of curvilinear convex longitudinal cross section on its outer periphery, a telescoping annular rim member and a rubber sleeve occupying an annular space between said hub and rim members in a condition of substantial mass-tension whereby to effect a driving connection therebetween.

2. A gear comprising, in combination, an annular hub member of curvilinear convex longitudinal cross section on its outer periphery, a telescoping annular rim member and a rubber sleeve occupying an annular space between said hub and rim members in a condition of substantial elongation whereby to effect a driving connection therebetween.

3. A gear comprising, in combination, an annular hub member, a telescoping annular rim member, and a rubber sleeve occupying an annular space between said hub and rim members in a condition of substantial mass-tension, the conformation of said hub and rim members being such that the mass-tension upon the central longitudinal portion of said rubber sleeve being greater than that upon its axial extremities, said rubber sleeve effecting a driving connection between the hub and rim members.

4. A gear comprising in combination an annular hub member, a telescoping annular rim member, an annular space between said hub and rim members radially greater at its end portions than at its central portion to permit a limited universal movement between the hub and rim members and a rubber sleeve occupying said annular space in a condition of substantial mass tension whereby to effect a driving connection between said hub and rim members.

RALPH H. ROSENBERG.